J. CURRIE AND H. W. BELL.
DUST CAP FOR PNEUMATIC VALVES
APPLICATION FILED AUG. 7, 1919. RENEWED JUNE 1, 1920.
1,353,125. Patented Sept. 14, 1920.
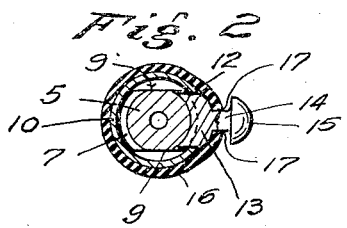
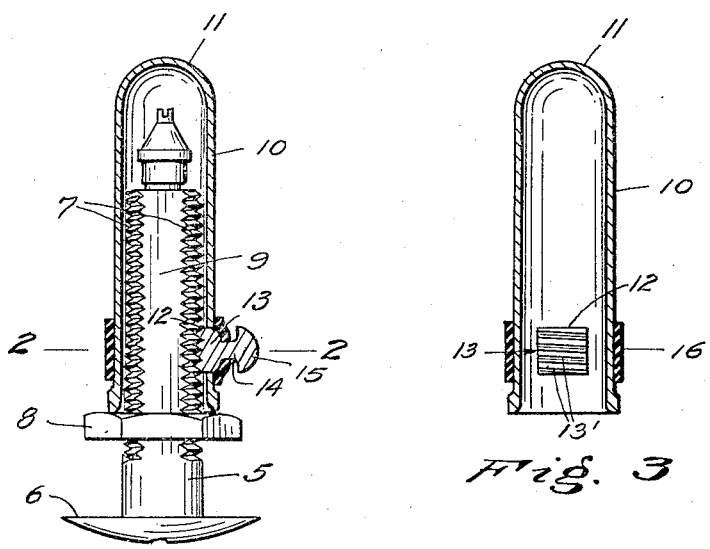
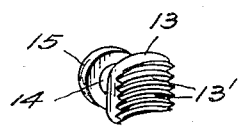
INVENTORS:
John Currie and
Henry W. Bell
by Pierre Barnes
ATTORNEY

UNITED STATES PATENT OFFICE.

JOHN CURRIE AND HENRY W. BELL, OF SEATTLE, WASHINGTON.

DUST-CAP FOR PNEUMATIC VALVES.

1,353,125.      Specification of Letters Patent.      Patented Sept. 14, 1920.

Application filed August 7, 1919, Serial No. 315,971. Renewed June 1, 1920. Serial No. 385,766.

*To all whom it may concern:*

Be it known that we, JOHN CURRIE and HENRY W. BELL, citizens of the United States, residing at Seattle, in the county of King and State of Washington, have invented certain new and useful Improvements in Dust-Caps for Pneumatic Valves, of which the following is a specification.

This invention relates to dust caps for the inflating valves of pneumatic tires; and its object is the perfecting of devices of this character to render the same more convenient to use.

The invention consists in a dust cap provided with novel means for detachably securing the same to the valve tube and enable the cap being rapidly removed from or replaced upon the tube.

In the accompanying drawing Figure 1 is a longitudinal sectional view of our improved dust cap shown applied. Fig. 2 is a sectional view taken substantially through 2—2 of Fig. 1. Fig. 3 is a longitudinal sectional view of the dust cap taken through a plane at right angles to that in which it is represented in Fig. 1. Fig. 4 is a perspective view of the locking block, shown detached.

Referring to said drawings, the numeral 5 designates the casing, conventionally known as the "tube", of a tire inflating valve. Said casing being provided at one end with the usual head 6 and is screw-threaded, as at 7, for a distance from its other end to accommodate a securing nut 8 which engages against the inner periphery of a wheel rim.

For the purpose of affording a wrench hold upon the tube 5 to prevent the latter turning when the nut 8 is being screwed down, the tubes are usually provided at diametrically opposite sides with flat faces 9 unprovided with screw threads.

In carrying out our invention we provide a dust cap 10 of a substantially cylindrical form, preferably, which is closed at its outer end 11 and of an internal diameter slightly greater than the diameter of the tube 5.

Adjacent to its open inner end said cap is provided in its periphery with an aperture 12 of preferably rectangular shape.

Fitting within said aperture is a locking device, shown separately in Fig. 4, having an inner portion, or block, 13 of a segment of an annulus, from the convex face thereof extends radially a stem 14 which terminates in a relatively large head or knob 15. The inner or concave face of the block is preferably cut or otherwise formed to provide teeth or screw threads 13' adapted to register with the tube threads 7.

16 represents a band of rubber, or other suitable elastic or resilient material which surrounds the dust cap and embraces the block 13 by having the stem 14 extend through a hole 17 provided in the band. This band, moreover, is of greater width than the depth of aperture 12, measured longitudinal of the cap, so that it will serve to exclude dirt from the cap about the block 13.

By the operator pulling the block outwardly through the instrumentality of the knob 15 the block teeth 13' are withdrawn from the chamber of the cap whereupon the cap may be placed without turning over or removed from the valve tube.

When the cap is thus applied, by releasing the knob, the power of the band 16 asserts itself to force the block inwardly into engagement with the tube threads 7 at one side or the other of the inner tube. Should the block threads fail to register with the tube threads, the operator rotates the cap until they do and also if required to cause the cap to be brought tight against the nut 8.

While we have illustrated and described the block 13 as being provided with screw threads, we do not wish to be confined to such practice as it is apparent that the block may be made of a relatively soft or flexible material that will embed itself sufficiently in the tube threads to securely retain the cap against accidental dislodgment.

What we claim, is—

1. A dust cap of the character described, comprising a tubular shell open at one end and provided with an aperture in its periphery, a block fitting within said aperture for movement radially of the shell axis, and an elastic band of greater width than the depth of the aperture longitudinally of the shell, said band extending circumferentially about the shell and engaging the block to force the latter inwardly of the shell.

2. A dust cap of the character described, comprising a tubular shell open at one end and provided with an aperture in its periphery, a block fitting within said aperture for movement radially of the shell axis, a stem provided on said block, and an elastic band extending circumferentially about the shell and engaging the block to force the latter inwardly of the shell, said band being provided with a hole to receive the aforesaid block-stem.

3. A dust cap of the character described, comprising a shell open at one end and having an aperture in its periphery, a block extending into said aperture, said block being provided with screw threads on its inner face, and resilient means extending circumferentially about the shell and tending to yieldingly hold the threaded portion of the block within the chamber of said shell.

4. The combination with a screw-threaded casing tube of a tube inflating valve, of a dust cap for said tube, said cap being provided with an aperture in its periphery, a block extending into said aperture and provided interiorly of the shell with screw threads, resilient means extending circumferentially about the shell for yieldingly retaining the block threads in engageable positions with respect to the tube threads, and a knob attached to said block whereby the latter may be disengaged from said tube.

Signed at Seattle, Washington, this 1st day of August, 1919.

JOHN CURRIE.
HENRY W. BELL.

Witnesses:
 PIERRE BARNES,
 ELIZABETH JOHNSON.